No. 876,596. PATENTED JAN. 14, 1908.
D. R. SCHOLES.
TRANSMISSION TOWER.
APPLICATION FILED MAY 21, 1907.
3 SHEETS—SHEET 1.
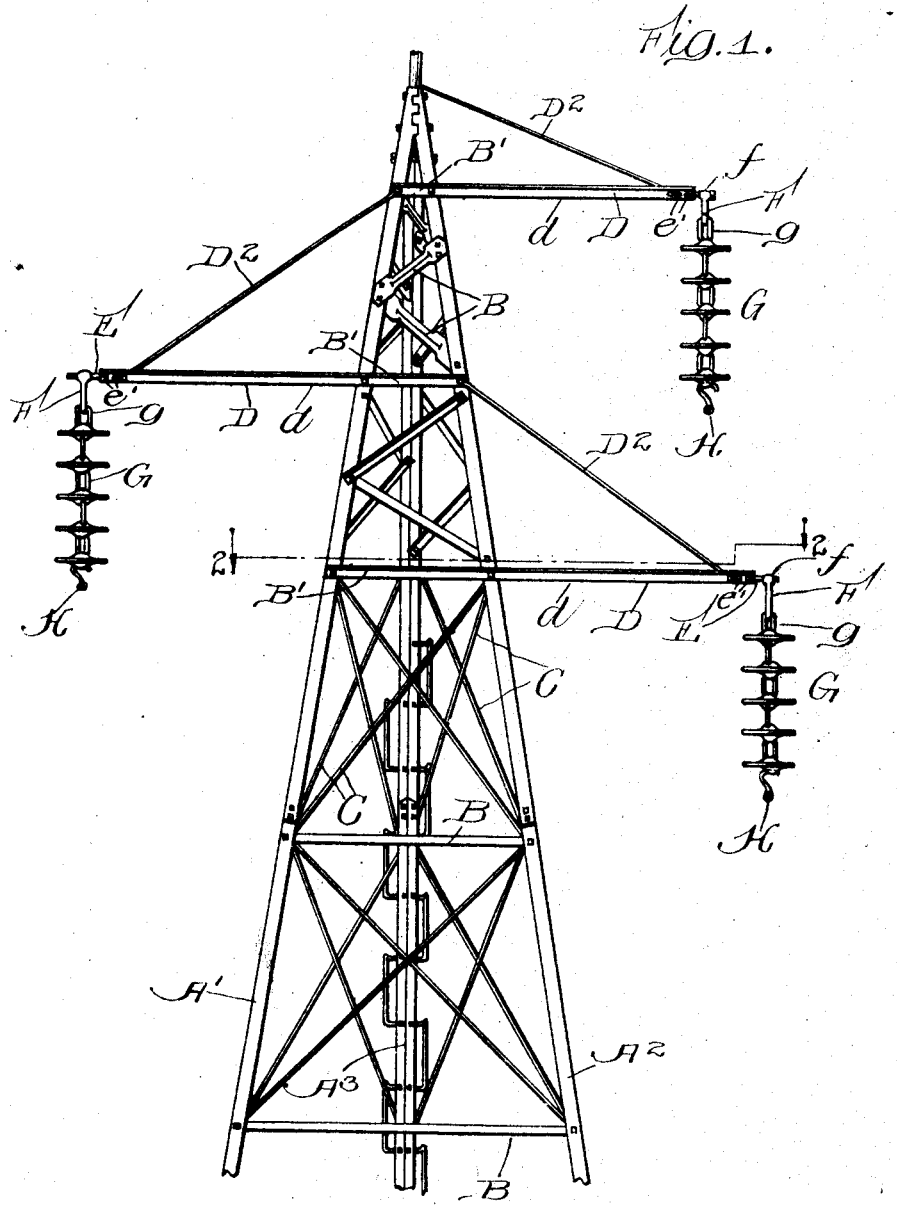

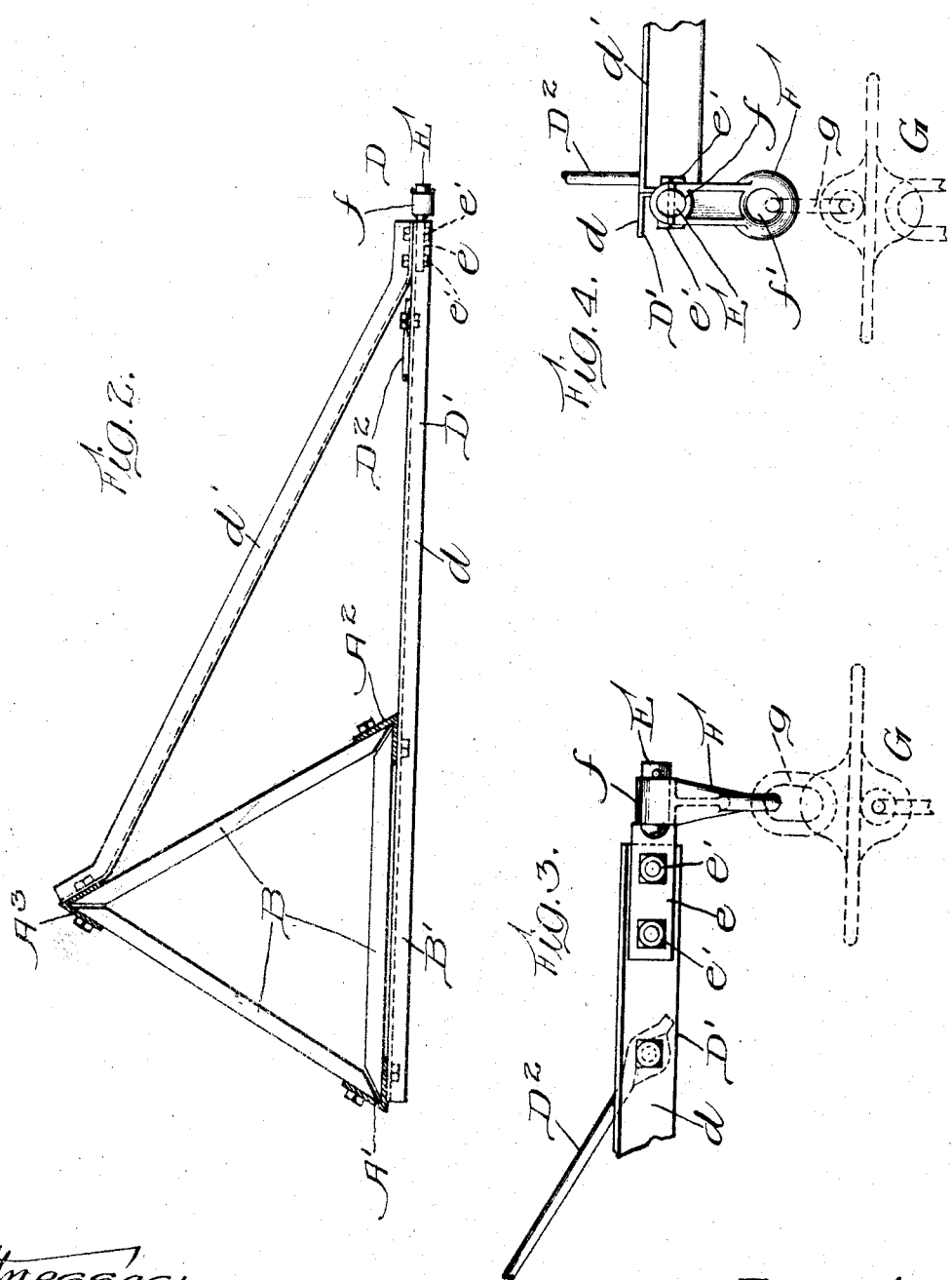

No. 876,596. PATENTED JAN. 14, 1908.
D. R. SCHOLES.
TRANSMISSION TOWER.
APPLICATION FILED MAY 21, 1907.

3 SHEETS—SHEET 3.

Witnesses: Inventor
Daniel R. Scholes
By D. W. Hopkins
His Atty

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION.

TRANSMISSION-TOWER.

No. 876,596.

Specification of Letters Patent.

Patented Jan. 14, 1908.

Application filed May 21, 1907. Serial No. 374,964.

*To all whom it may concern:*

Be it known that I, DANIEL R. SCHOLES, a citizen of the United States, residing at Chicago, in the county of Cook and State of Illinois, have invented certain new and useful Improvements in Transmission-Towers, of which the following is a specification.

The present invention relates to a transmission tower for carrying electric transmission wires and its object is to provide an improved tower which is particularly adapted for this purpose, especially where suspension insulators are used, but which is also adapted for the general purposes of towers.

Figure 5:
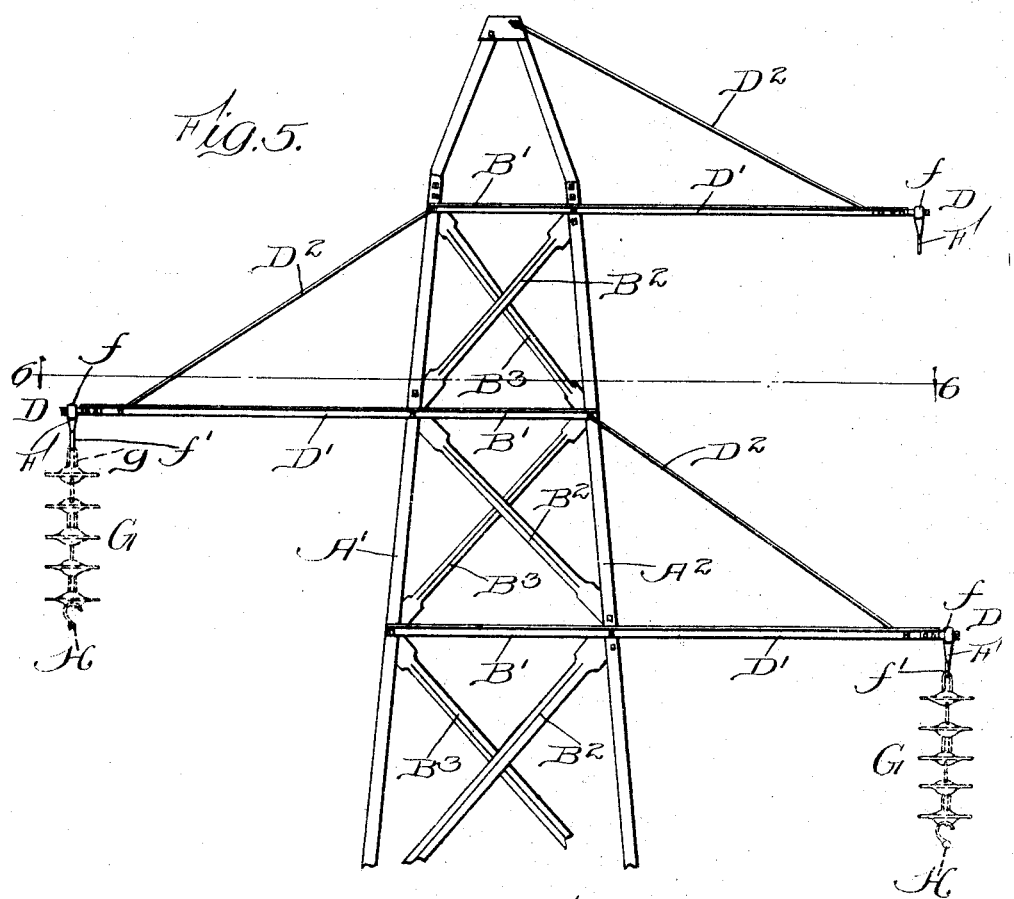
Figure 6:
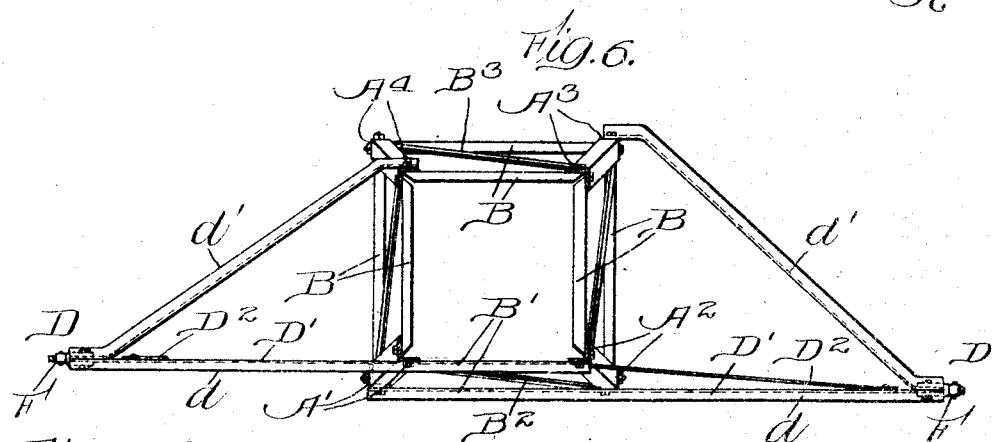

The invention consists in the features of novelty that are hereinafter described, reference being had to the accompanying drawings, which are made a part hereof and in which:

Figure 1 is an elevation of the upper part of a triangular tower embodying the invention. Fig. 2 is a horizontal section thereof on the line 2—2, Fig. 1, on a larger scale. Figs. 3 and 4 are, respectively, a side elevation and an end elevation, on a still larger scale, of the outer end of one of the cross arms and a portion of a suspension insulator carried thereby. Fig. 5 is an elevation of the upper part of a quadrangular tower embodying the invention. Fig. 6 is a horizontal section thereof on the line 6—6, Fig. 5, none of the parts below the lower cross-arm being shown.

As shown in Figs. 1 and 2, the tower proper is constructed of three corner posts, $A'$, $A^2$ and $A^3$, preferably made of angle iron of V-shape in cross section, a number of braces B preferably made of angle-iron of L-shape in cross section, and a number of tie rods C, all arranged and secured together in customary or in any suitable manner to form a triangular tower.

The tower thus constructed is provided with a plurality of cross arms, D, (three being shown in the drawing) arranged, alternately, on opposite sides of the tower. All of these cross-arms are of like construction, so that a description of one will suffice for all.

Each cross-arm is made of two members, $d$ and $d'$ preferably made of angle iron of L-shape in cross section. The member $d$ is straight, from end to end, and disposed horizontally. It comprises a portion $B'$ which lies against the flat sides of the posts $A'$ and $A^2$, and is secured to them so as to form a brace, and a portion $D'$ which projects from the side of the tower and, (the entire member being straight) lies in the plane of the side $A'$—$A^2$ of the tower. The member $d'$ is straight excepting that its inner end is bent to conform to one face of the post $A^3$, to which it is secured and its outer end is bent to conform to one side of the straight member $d$, the outer ends of the two members being secured together.

One advantage in making one member of the cross-arm straight is that the cost of bending it adjacent to the tower post, in order that it may meet the other member, is saved, but a more important advantage is that it causes the major part of the weight or downward stress to fall substantially in the plane of one side of the tower,—or two of its corner posts, (being the plane of the greatest vertical resistance) and by arranging the cross-arms on opposite sides of the tower, these stresses which tend to tip the tower over, sidewise, are balanced.

An inevitable incident to arranging the projecting portion of one member of the cross arm, in the plane of two of the corner posts is that the projecting portions of the two arms are of unequal length and form, with that side of the tower which their inner ends include, a scalene triangle.

Each of the cross-arms is additionally supported by a tensile brace or rod $D^2$ one end of which is secured to the member $d$, near its outer end and the other end of which is secured to the adjacent corner post, preferably where it intercepts the member $d$ of the next higher cross arm, so that the projecting portion of the member $d$, the tensile brace and two of the corner posts lie in substantially the same plane.

Each cross-arm carries at its outer end a stud E, secured to it through the medium of a shank $e$ perforated for the passage of bolts $e'$ which pass also through perforations through the depending webs of the members $d$ and $d'$, whereby said members also are secured together. This stud occupies an eye $f$ in the upper end of a hanger F, the lower end of which has an eye $f'$ for the passage of a ring or loop $g$ on the top of the suspended insulator, G, to the bottom of which the cable, H, is attached. The axes of the eyes are parallel, so that one permits the hanger to swing longitudinally, relatively to the suspended cable, while the other permits the insulator to swing transversely, thereby forming a universal joint between the insulator and cross-arm.

The tower shown in Figs. 5 and 6 has four corner posts, A', A², A³, and A⁴, instead of three, but the cross-arms are constructed and arranged precisely as above described, so far as the functions of the parts are concerned. In both forms of the invention the cross-arms are arranged, alternately, on opposite sides of the tower and at different elevations and this is an advantageous arrangement of them when they are used to carry suspension insulators, because it prevents the cables, when swinging from side to side, from coming as close to each other as they would if suspended at the same elevation—other things being equal; in both, one member of the cross-arm is straight and its projecting portion lies in the plane of two of the corner posts; in both, one member of the cross arm is secured to two corner posts while the other member is secured to but one; in both, the cross arm is supported by a tensile brace; in both, the straight members of all of the cross arms are secured to the same two posts; in both the cross arms are arranged alternately on opposite sides of the tower and in both the cross arms carry suspension insulators.

Preferably each panel of the tower on that side to which the members $d$ of the cross-arms are secured has a diagonal brace B² extending from the intersection of one post with the member $d$ of one cross-arm to the intersection of the other post with the member $d$ of the next cross arm, so that in vertically adjacent panels the diagonal braces incline in opposite directions. This arrangement of these diagonal braces is most desirable as it braces and strengthens the structure at what may be called the fulcrum points of the cross arms.

What I claim as new is:

1. A transmission tower having a plurality of corner posts, and a cross-arm made of two members secured to the corner posts and having portions of unequal lengths projecting outward therefrom.

2. A transmission tower having a plurality of corner posts, and a cross-arm made of two members secured to the corner posts and having portions of unequal lengths projecting outward therefrom, one of said projecting portions lying in the plane of two of the corner posts.

3. A transmission tower having a plurality of corner posts, and a cross-arm made of two members secured to the posts and having portions of unequal lengths projecting outward therefrom, one of said members having also a portion forming a brace extending between two of the corner posts and secured thereto.

4. A transmission tower having a plurality of corner posts, and a cross-arm made of two members secured to the posts and having portions of unequal lengths projecting outward therefrom, one of said members being straight and having a portion forming a brace extending between two of the corner posts and secured thereto.

5. A transmission tower having a plurality of corner posts, and a cross-arm made of two members secured to the posts and having portions of unequal lengths projecting outward therefrom, and a tensile brace secured at one end to the cross-arm and at the other end to the tower above the cross-arm.

6. A transmission tower having a plurality of corner posts, and a cross-arm made of two members secured to the corner posts and having portions of unequal lengths projecting outward therefrom, one of said projecting portions lying in the plane of two of the corner posts, and a tensile brace, one end of which is secured to the cross-arm and the other end of which is secured to the tower above the cross-arm.

7. A transmission tower having three corner posts, and a cross-arm made of two members secured to the corner posts and having portions of unequal lengths projecting outward therefrom.

8. A transmission tower having three corner posts, and a cross-arm made of two members secured to the corner posts and having portions of unequal lengths projecting outward therefrom, one of said projecting portions lying in the plane of two of the corner posts.

9. A transmission tower having three corner posts, and a cross-arm made of two members secured to the posts and having portions of unequal lengths projecting outward therefrom, one of said members having also a portion forming a brace extending between two of the corner posts and secured thereto.

10. A transmission tower having three corner posts and a cross-arm made of two members secured to the posts and having portions of unequal lengths projecting therefrom, the member having the shorter projecting portion being straight, and having a portion forming a brace extending between two of the corner posts and secured thereto.

11. A transmission tower having a plurality of cross-arms arranged, alternately, on opposite sides of the tower and at different elevations, in combination with a plurality of suspension insulators and universal joints, suspending them from the cross-arms, respectively, each of said joints comprising a stud on the cross-arm, a hanger having an eye at each end, one of which surrounds said stud loosely so as to be capable of turning freely thereon, and a part loosely occupying the other eye and supporting the insulator.

12. A transmission tower having a plurality of corner-posts and a cross arm made of two members, one of which is secured to two of said posts and the other of which is secured to but one of said posts, and terminating at the post to which it is secured, said members having portions projecting outward and secured together.

13. A transmission tower having a plurality of corner posts, a plurality of cross-arms, each of which has a member secured to two of said posts and forming a brace, and a diagonal brace extending from the intersection of one of said posts with one of said members to the intersection of the other of said posts with the other of said members.

14. A transmission tower having a plurality of corner posts, a plurality of cross-arms arranged alternately on opposite sides of the tower, each of said cross-arms having a member secured to two of said posts and having a portion projecting from the tower and a diagonal brace extending from the intersection of one of said posts with one of said members to the intersection of the other of said posts with the other of said members.

15. A transmission tower having a plurality of corner posts, a plurality of cross-arms arranged alternately on opposite sides of the tower, each of said cross arms having a member secured to two of said posts and having a portion projecting from the tower, a diagonal brace extending from the intersection of one of said posts with one of said members to the intersection of the other of said posts with the other of said members, and a diagonal brace on the opposite side of the post, extending from one post to another, said braces being arranged in directions that cross each other.

DANIEL R. SCHOLES.

Witnesses:
J. FLANIGAN,
F. L DOLE.